(12) United States Patent
Lewis

(10) Patent No.: US 6,772,116 B2
(45) Date of Patent: Aug. 3, 2004

(54) METHOD OF DECODING TELEGRAPHIC SPEECH

(75) Inventor: James R. Lewis, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 09/818,079

(22) Filed: Mar. 27, 2001

(65) Prior Publication Data
US 2002/0143525 A1 Oct. 3, 2002

(51) Int. Cl.7 .............................................. G10L 15/00
(52) U.S. Cl. ..................... 704/231; 704/236; 704/255
(58) Field of Search ........................ 704/5, 232, 254, 704/201, 231, 236, 250, 255

(56) References Cited

U.S. PATENT DOCUMENTS 5,832,480 A * 11/1998 Byrd et al. ..................... 707/5
6,081,772 A * 6/2000 Lewis ............................ 704/1
6,185,528 B1 * 2/2001 Fissore et al. ............... 704/232
6,539,353 B1 * 3/2003 Jiang et al. .................. 704/254
2002/0013707 A1 * 1/2002 Shaw et al. .................. 704/257

OTHER PUBLICATIONS

Jean Berko Gleason and Nan Bernstein Ratner, Psycholinguistics,(Harcourt Brace Jovanovich College Publishers, 1993).

* cited by examiner

Primary Examiner—Susan McFadden
(74) Attorney, Agent, or Firm—Akerman Senterfitt

(57) ABSTRACT

A method of selecting a language model for decoding received user spoken utterances in a speech recognition system can include a series of steps. The steps can include computing confidence scores for identified closed-class words and computing a running average of the confidence scores for a predetermined number of decoded closed-class words. Additionally, based upon the running average, telegraphic decoding can be selectively enabled.

19 Claims, 3 Drawing Sheets

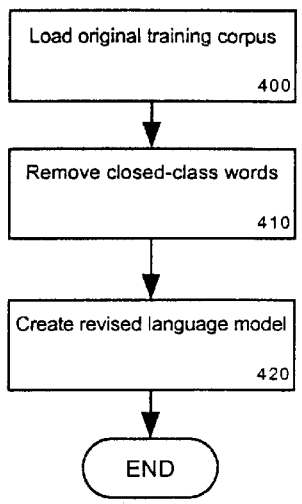
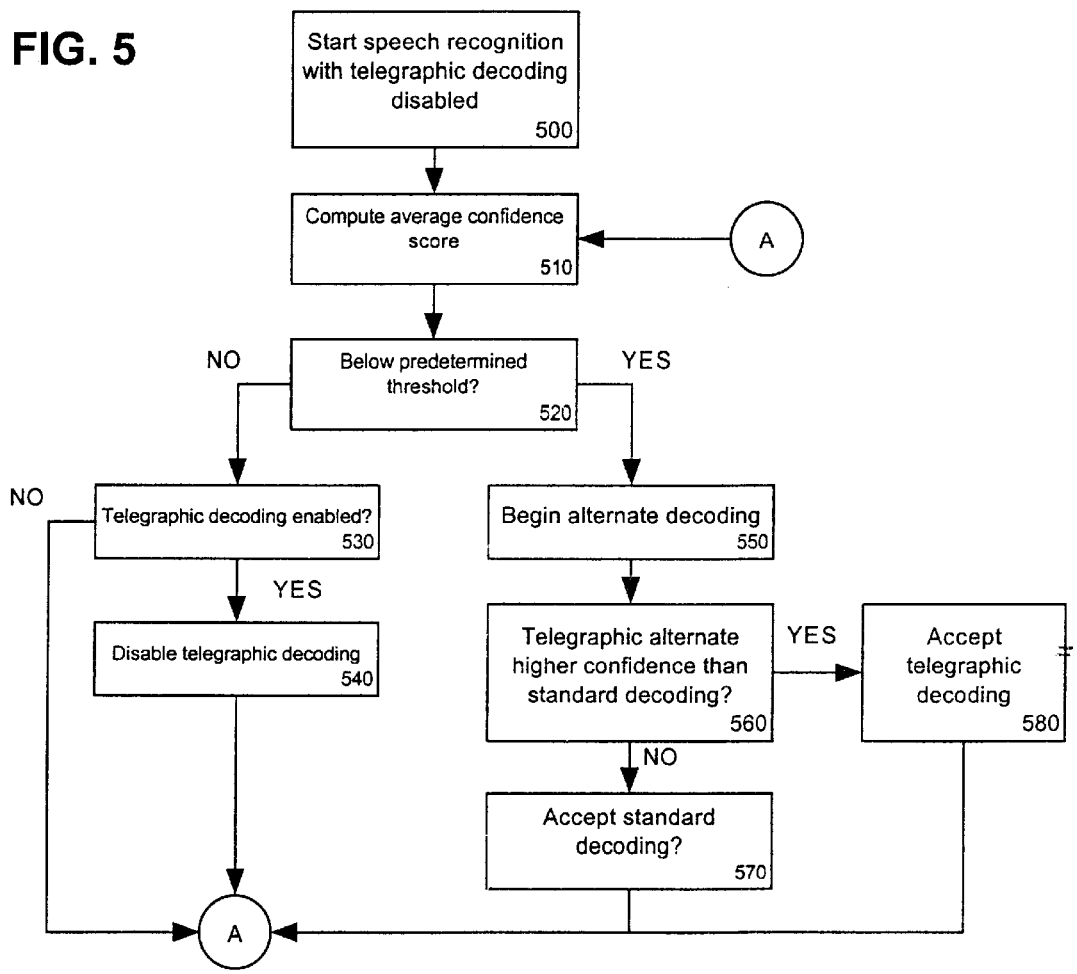

METHOD OF DECODING TELEGRAPHIC SPEECH

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition, and more particularly, to detecting and decoding telegraphic speech within a speech recognition system.

2. Description of the Related Art

Speech recognition is the process by which an acoustic signal received by microphone is converted to a set of text words, numbers, or symbols by a computer. These recognized words may then be used in a variety of computer software applications for purposes such as document preparation, data entry, and command and control. Improvements to speech recognition systems provide an important way to enhance user productivity.

Speech recognition systems can model and classify acoustic signals to form acoustic models, which are representations of basic linguistic units referred to as phonemes. Upon receipt of the acoustic signal, the speech recognition system can analyze the acoustic signal, identify a series of acoustic models within the acoustic signal and derive a list of potential word candidates for the given series of acoustic models.

Subsequently, the speech recognition system can contextually analyze the potential word candidates using a language model as a guide. Specifically, the language model can express restrictions imposed on the manner in which words can be combined to form sentences. The language model can express the likelihood of a word appearing immediately adjacent to another word or words. Language models used within speech recognition systems typically are statistical models. A common example of a language model can be an n-gram model. In particular, the bigram and trigram models are exemplary n-gram models typically used within the art.

Conventional speech recognition system language models are derived from an analysis of a grammatical training corpus of text. A grammatical training corpus contains text which reflects the ordinary grammatical manner in which human beings speak. The training corpus can be processed to determine the statistical and grammatical language models used by the speech recognition system for converting speech to text, also referred to as decoding speech. It should be appreciated that such methods are known in the art and are disclosed in *Statistical Methods for Speech Recognition* by Frederick Jelinek (The MIT Press, 1997), which is incorporated herein by reference.

Telegraphic expressions are commonly used as newspaper headlines, as bulleted lists in presentations, or any other place where brevity may be desired. A telegraphic expression is speech that is limited in meaning and produced without inflections or function words. Function words, also called closed-class words, can include determiners such as "a" and "the" and demonstratives such as "this" or "that". Other closed-class words can include pronouns, except for nominative case pronouns such as "he" and "she", auxiliary verbs such as "have", "be", "will", and auxiliary verb derivatives. Closed-class words serve the functional purpose of tying open-class words, called content words, together. For example, the closed-class words within the grammatical text phrase, "the boy has pushed the girl", are "the", and "has". By removing these closed-class words, the resulting text, "boy pushed girl" is said to be a telegraphic expression. Notably, closed-class words, such as demonstratives and pronouns, typically are comprised of a limited number of members. Such words are said to be closed-class words because new functional words are rarely added to a language. Accordingly, the number of closed-class words remains fairly constant.

In contrast to close-class words, open-class words can contain an infinite number of members. Open-class words can include nouns, verbs, adverbs, and adjectives. These words can be invented and added to a language as a need arises, for example when a new technology is invented.

Human beings can easily and naturally read and speak in terms of telegraphic expressions. Conventional speech recognition systems using grammatical language models, however, can be inaccurate when converting telegraphic speech to text and often introduce errors into the text output. Specifically, because conventional speech recognition systems rely on grammatically based language models, such systems often insert unwanted function words into the textual representation of a received telegraphic user spoken utterance. The unwanted words result in inaccurate decoding of user spoken utterances to text.

SUMMARY OF THE INVENTION

The invention disclosed herein concerns a method and a system for use in a speech recognition system for applying a telegraphic language model to a received user spoken utterance. The user spoken utterance can be converted to text, or decoded, using the telegraphic language model. The invention also can include generating the telegraphic language model from an existing training corpus.

In particular, subsequent to generating a telegraphic language model, the speech recognition system can enable or disable decoding using the telegraphic language model, referred to as telegraphic decoding. The speech recognition system can continually calculate a running average of closed-class word confidence scores. If that average falls below a predetermined threshold value, the speech recognition system can begin decoding received user spoken utterances with a conventional grammatically based language model, referred to as a conventional language model, and a telegraphic language model. The resulting text having the highest confidence score can be provided as output text. If the running average later exceeds the threshold value, the speech recognition system can disable the telegraphic decoding. It should be appreciated that if the system has sufficient computational resources, the mechanism for engaging and disabling telegraphic decoding is not necessary. In that case, for example, the speech recognition system can process all received user spoken utterances using both language models, selecting the resulting text having the highest confidence score. Briefly, a confidence score reflects the likelihood that a particular word candidate accurately reflects the user spoken utterance from which the word candidate was derived.

One aspect of the invention can include a method of selecting a language model in a speech recognition system for decoding received user spoken utterances. The method can include the steps of computing confidence scores for identified closed-class words and computing a running average of the confidence scores for a predetermined number of decoded closed-class words. Based upon the running average, the step of selectively enabling telegraphic decoding to be performed can be included. Notably, telegraphic decoding can be enabled in addition to conventional decoding. Also included can be the step of selectively disabling telegraphic decoding based upon the running average.

Another embodiment of the invention can include a method of decoding received user spoken utterances in a speech recognition system. In that case, the method can include decoding the received user spoken utterance with a conventional language model resulting in a first word candidate and decoding the received user spoken utterance with an alternate language model resulting in a second word candidate. The alternate language model can be a telegraphic language model. Also included can be the steps of computing a confidence score for the first word candidate and the second word candidate. The step of selecting the word candidate having the highest confidence score also can be included. The first word candidate and the second word candidate can be the same word, but have different confidence scores. Also, if the first word candidate and the second word candidate are not the same word but have the same confidence scores, either the first or the second word candidate can be selected.

Another aspect of the invention can include a method of developing a telegraphic language model for use with a speech recognition system for converting telegraphic user spoken utterances to text. In that case, the method can include the steps of loading an existing training corpus into a computer system and revising the training corpus by removing closed-class words from the training corpus. The step of developing a telegraphic language model from the revised training corpus also can be included.

Another aspect of the invention can include a speech recognition system for converting telegraphic user spoken utterances to text. In that case, the system can include one or more acoustic models. The acoustic models can represent linguistic units for determining one or more word candidates from the telegraphic user spoken utterance. Also included can be one or more language models. The language models can provide contextual information corresponding to the one or more word candidates. Notably, the one or more language models can include one or more telegraphic language models. The speech recognition system further can include a processor which can process the telegraphic user spoken utterances according to the acoustic models and the language models.

Another aspect of the invention can include a machine readable storage, having stored thereon a computer program having a plurality of code sections executable by a machine for causing the machine to perform a series of steps. The steps can include computing confidence scores for identified closed-class words and computing a running average of the confidence scores for a predetermined number of decoded closed-class words. Based upon the running average, the step of selectively enabling telegraphic decoding to be performed can be included. Notably, telegraphic decoding can be enabled in addition to conventional decoding. Also included can be the step of selectively disabling telegraphic decoding based upon the running average.

Another embodiment of the invention can include a machine readable storage, having stored thereon a computer program having a plurality of code sections executable by a machine for causing the machine to perform a series of steps. In that case, the steps can include decoding the received user spoken utterance with a conventional language model resulting in a first word candidate and decoding the received user spoken utterance with an alternate language model resulting in a second word candidate. The alternate language model can be a telegraphic language model. Also included can be the steps of computing a confidence score for the first word candidate and the second word candidate. The step of selecting the word candidate having the highest confidence score also can be included. The first word candidate and the second word candidate can be the same word, but have different confidence scores. Also, if the first word candidate and the second word candidate are not the same word but have the same confidence scores, either the first or the second word candidate can be selected.

Another aspect of the invention can include a machine readable storage, having stored thereon a computer program having a plurality of code sections executable by a machine for causing the machine to perform a series of steps. In that case, the steps can include loading an existing training corpus into a computer system and revising the training corpus by removing closed-class words from the training corpus. The step of developing a telegraphic language model from the revised training corpus also can be included.

BRIEF DESCRIPTION OF THE DRAWINGS

There are presently shown in the drawings embodiments of which are presently preferred, it being understood, however, that the invention is not so limited to the precise arrangements and instrumentalities shown, wherein:

FIG. 4 is a flow chart illustrating an exemplary method of configuring a telegraphic language model.

FIG. 5 is a flow chart illustrating an exemplary method of the invention.

DETAILED DESCRIPTION OF THE INVENTION

The invention disclosed herein concerns a method and a system for use in a speech recognition system for applying a telegraphic language model to a received user spoken utterance. The invention further can include generating the telegraphic language model for recognizing telegraphic, rather than grammatical, expressions. The telegraphic language model can be incorporated within a speech recognition system for converting telegraphic expressions to text. Notably, both a conventional grammatical language model and a telegraphic language model can be included within the speech recognition system. In one embodiment, the invention can selectively enable the telegraphic language model to be applied to received user spoken utterances for converting those utterances to text. In that case, both the conventional language model and the telegraphic language model can be applied to the received user spoken utterance allowing the speech recognition system to select the result having the highest confidence score as the output.

The invention can utilize a confidence score to determine whether to apply a grammatically based language model or a telegraphic language model to a received user spoken utterance. A confidence score, which is well known in the art, reflects the likelihood that a particular word candidate or series of word candidates accurately reflects a corresponding user spoken utterance. The confidence score can be a value derived from acoustic models, lexical models, and language models. For example, the confidence score can take into account the likelihood that a particular word candidate or word candidates represent a user spoken utterance as determined using an acoustic model, in addition to, the probability that the particular word candidate can be located next to another word or group of words as determined using a language model.

If the computer system containing the speech recognition system has sufficient processing power, i.e., adequate memory capacity and processing speed, one embodiment of the invention can include processing the received user spoken utterance using a telegraphic language model and a grammatically based language model. In that case, the speech recognition system can select a possible text output from word candidates obtained using each language model. Specifically, the word candidate having the highest confidence score can be selected. If the computer system does not have sufficient resources such that processing the received user spoken utterance using both language models would require an unacceptable amount of processing time for a realtime system, the invention can enable an alternate language model for a limited amount of time.

Figure 1:
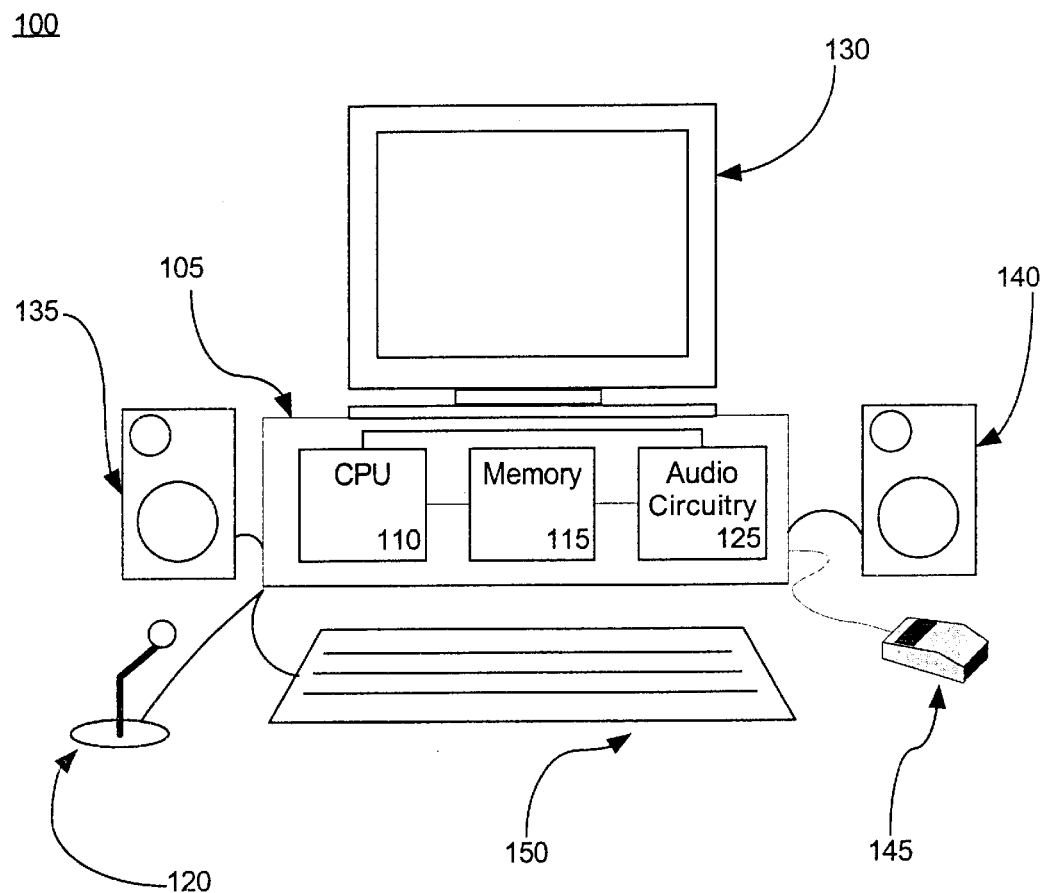
FIG. 1 is a schematic diagram of an exemplary computer system on which the invention can be used.

FIG. 1 depicts a typical computer system 100 for use in conjunction with the present invention. The system can include a computer 105 including a central processing unit 110 (CPU), one or more memory devices 115, and associated circuitry. The memory devices 115 can be comprised of an electronic random access memory and a bulk data storage medium. The system also can include a microphone 120 operatively connected to the computer system through suitable interface circuitry 125, and an optional user interface display unit 130 such as a video data terminal operatively connected thereto. The CPU can be comprised of any suitable microprocessor or other electronic processing unit, as is well known to those skilled in the art. Speakers 135 and 140, as well as an interface device, such as mouse 145, and keyboard 150, can be provided with the system, but are not necessary for operation of the invention as described herein. The various hardware requirements for the computer system as described herein can generally be satisfied by any one of many commercially available high speed computers.

Figure 2:
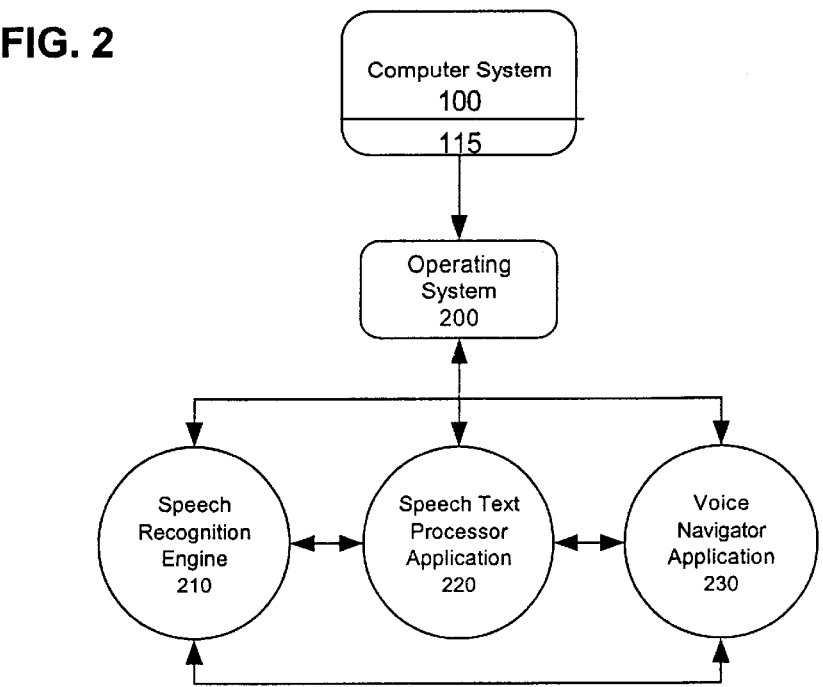
FIG. 2 is a schematic diagram depicting an exemplary architecture for speech recognition.

FIG. 2 is a schematic diagram illustrating a typical architecture for a speech recognition system in computer 100. As shown in FIG. 2, within the memory 115 of computer system 100 can be an operating system 200 and a speech recognition engine 210. Also included can be a speech text processor application 220 and a voice navigator application 230. The invention, however, is not limited in this regard and the speech recognition engine 210 can be used with any other application program which is to be voice enabled. In FIG. 2, the speech recognition engine 210, speech text processor application 220, and the voice navigator application 230 are shown as separate application programs. It should be noted however that the invention is not limited in this regard, and these various application programs can be implemented as a single, more complex application program. For example the speech recognition engine 210 can be combined with the speech text processor application 220 or with any other application to be used in conjunction with the speech recognition engine 210. Also, if no other speech controlled application programs are to be operated in conjunction with the speech text processor application 220 and speech recognition engine 210, the system can be modified to operate without the voice navigator application 230. The voice navigator application 230 primarily helps coordinate the operation of the speech recognition engine 210.

The aforementioned components can be realized in a centralized fashion within the computer system 100. Alternatively, the aforementioned components can be realized in a distributed fashion where different elements are spread across several interconnected computer systems. In any case, the components can be realized in hardware, software, or a combination of hardware and software. Any kind of computer system, or other apparatus adapted for carrying out the methods described herein is suited. The system as disclosed herein can be implemented by a programmer, using commercially available development tools for the particular operating system used.

Computer program in the present context means any expression, in any language, code or notation, of a set of instructions intended to cause a system having an information processing capability to perform a particular function either directly or after either or both of the following a) conversion to another language, code, or notation; b) reproduction in a different material form.

In operation, audio signals representative of sound received in microphone 120 can be processed within computer 100 using conventional computer audio circuitry so as to be made available to the operating system 200 in digitized form. Alternatively, audio signals can be received via a computer communications network from another computer system in analog or digital format, or from another transducive device such as a telephone. The audio signals received by the computer system 100 are conventionally provided to the speech recognition engine 210 via the computer operating system 200 in order to perform speech recognition functions. As in conventional speech recognition systems, the audio signals can be processed by the speech recognition engine 210 to identify words spoken by a user into microphone 120.

Figure 3:
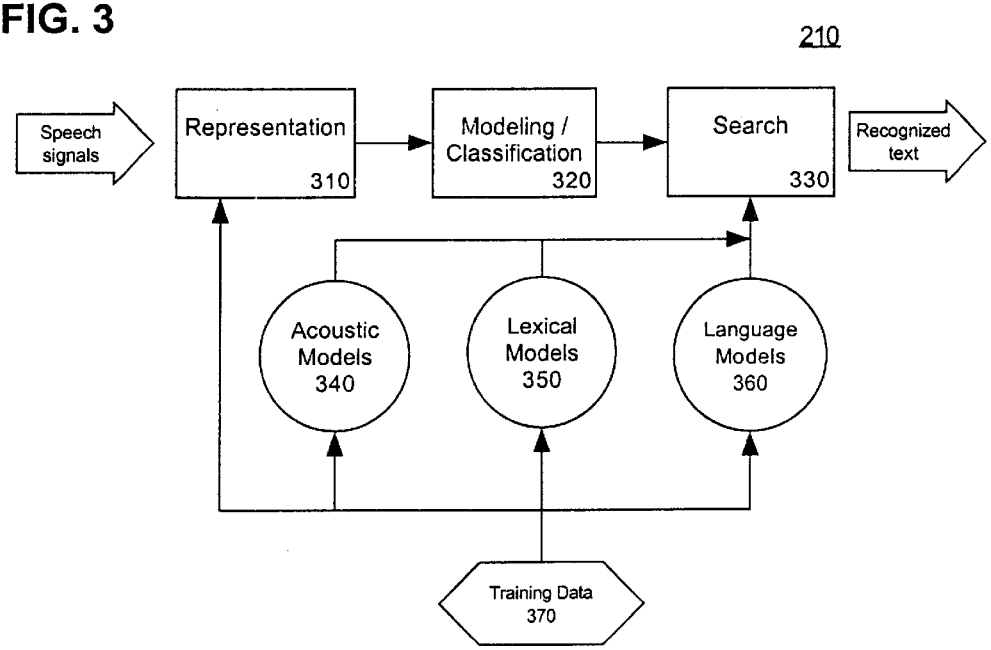
FIG. 3 is a block diagram showing typical components which can comprise a speech recognition engine.

FIG. 3 is a block diagram showing typical components which can comprise speech recognition engine 210. As shown in FIG. 3 the speech recognition engine 210 receives a digitized speech signal from the operating system. The system is subsequently transformed in representation block 310 into a useful set of data by sampling the signal at some fixed rate, typically every 10–20 msec. The representation block produces a new representation of the audio signal which can then be used in subsequent stages of the voice recognition process to determine the probability that the portion of the waveform just analyzed corresponds to a particular phonetic event. This process is intended to emphasize perceptually important speaker independent features of the speech signals received from the operating system. In modeling/classification block 320, algorithms process the speech signals further to adapt speaker-independent acoustic models to those of the current speaker. Finally, in search block 330, search algorithms are used to guide the search engine to the most likely words corresponding to the speech signal. The search process in search block 330 occurs with the help of acoustic models 340, lexical models 350, and language models 360.

Language models 360, for example trigrams, can be used to help restrict the number of possible words corresponding to a speech signal when a word is used together with other words in a sequence. The language model can be specified very simply as a finite state network, where the permissible words following each word are explicitly listed, or can be implemented in a more sophisticated manner making use of context sensitive grammar. In any case, it is often desirable to update the content of the language model with information concerning speech patterns likely to be encountered in the case of a specific user. The search process determines the word candidate having the highest confidence score as text output.

FIG. 4 is a flow chart illustrating an exemplary method for configuring a telegraphic language model for use with the speech recognition engine 210 of FIG. 2. At step 400, a method of the invention can begin with an original training corpus of text. The training corpus of text can be comprised of thousands of exemplary sentences. A conventional training corpus includes both open and closed-class words forming a grammatically based training corpus. Such a training corpus can include sentences which more accurately reflect the manner in which a user speaks in normal conversation. For example, the sentences comprising the training corpus need not be grammatically accurate, so long as the sentences reflect common word usage. After completion of step 400, the method can continue to step 410.

In step 410, the closed-class words can be removed from the training corpus. As mentioned, closed class words are function words which can include determiners such as "a", "an", and "the" and demonstratives such as "this", "that", "these", and "those". Other closed-class words can include pronouns, except for nominative case pronouns such as "he" and "she", auxiliary verbs such as "have", "be", "will", "may", "can", "must", "do", and "shall", as well as auxiliary verb derivatives. Closed-class words serve the functional purpose of tying open-class words, called content words, together. Notably, though prepositions are commonly classified as a category of closed-class words, prepositions can express content. Accordingly, prepositions can be left within telegraphic expressions. In any case, categories of closed-class words typically contain fewer members as compared to their open-class category counterparts which can include nouns, verbs, adjectives, and adverbs. As a result, the list of closed-class words to be removed from the training corpus can be limited in number, and thus, accurately specified. A more thorough description of open and closed-class words can be found in *Psycholinguistics* by Jean Berko Gleason and Nan Bernstein Ratner, pages 134–191 (Harcourt Brace Jovanovich College Publishers, 1993) which is incorporated herein by reference.

For example, within the training corpus sentence, "the boy has pushed the girl down the street in a cart", the closed class words are "the", "has", and "a". By removing these closed-class words, the resulting text, "boy pushed girl down street in cart" is said to be a telegraphic expression. As shown in the example and as previously mentioned, the preposition "in" conveys content and has been left in the resulting telegraphic expression. It should be appreciated that an empirical study of a training corpus and the use of prepositions within the training corpus can be used to determine whether increased accuracy can be achieved by removing prepositions from the training corpus, leaving prepositions in the training corpus, or alternatively, selectively removing particular prepositions from the training corpus.

After the closed-class words have been removed from the training corpus, the resulting training corpus essentially has been reformed. In particular the training corpus comprises telegraphic expressions. After completion of step 410, the method continues to step 420.

In step 420, the reformed training corpus of telegraphic expressions can be used to create a revised language model. The revised language model can be referred to as a telegraphic language model. Notably, the reformed language model can be constructed using techniques commonly known in the art as disclosed in *Statistical Methods for Speech Recognition* by Frederick Jelinek (The MIT Press, 1997), which is incorporated herein by reference. For example, the training corpus can be broken down into possible trigrams, where each trigram can be assigned a relative frequency or probability score. After completion of step 420, the method can end. The resulting revised language model can be included within a speech recognition system for converting telegraphic speech to text.

FIG. 5 is a flow chart illustrating an exemplary method for selectively applying a telegraphic language model or a grammatically based conventional language model (hereafter conventional language model) to a received user spoken utterance as performed by the speech recognition engine 210 of FIG. 2. It should be appreciated that although the invention provides a method of dynamically selecting a suitable language model to be applied to a particular received user spoken utterance, other methods can be used as well. One such method can be where the user issues a command instructing the speech recognition system to utilize an alternate language model until instructed to discontinue use of that language model. Another embodiment can include decoding each received user spoken utterance using both a telegraphic language model and a conventional language model and selecting the result having the highest confidence score. The term "decoding" as used herein can refer to the speech recognition process, including the application of a language model to a user spoken utterance subsequent to any acoustical processing.

In any event, at step 500, the method can begin with telegraphic decoding disabled. For example, the speech recognition system can operate in a state where only conventional decoding is enabled. Specifically, the speech recognition system can begin in a state where only a conventional language model is used to determine a word candidate from a list of possible word candidates as determined using the acoustic model. After completion of step 500, the method can continue to step 510.

In step 510, the speech recognition system can compute a confidence score for all word candidates decoded from a user spoken utterance. Thus, the speech recognition system can compute a running average of confidence scores of the last "n" closed-class words recognized by the speech recognition system. It should be appreciated that "n" can be a user adjustable parameter allowing the user to fine tune the speech recognition system. After completion of step 510, the method can continue to step 520.

In step 520, the running average confidence score can be compared to a predetermined threshold value. This value can be a user adjustable parameter allowing the user to fine tune the speech recognition system. A running average which is less than the predetermined threshold value can be an indication that the method of decoding presently enabled is yielding an unacceptably low confidence score. Accordingly, the speech recognition system can determine that a higher confidence score can be attainable using a method of decoding which relies on an alternate language model. Regardless, if the running average of the confidence score of the last n closed-class words is less than the predetermined threshold value, the method can continue to step 550. If not, the method can continue to step 530.

Continuing with step 530, the speech recognition system has determined that the running average of the confidence score of the last n closed-class words is sufficient. In step 530, the speech recognition system determines whether telegraphic decoding is enabled. If so, the method can continue to step 540 where telegraphic decoding can be disabled before continuing to jump circle A. If telegraphic decoding is disabled, the method can continue directly to jump circle A.

If the running average of the confidence score was greater than or equal to the predetermined threshold value as determined in step 520, the system can continue to step 550. In step 550, the system can decode the received user spoken utterance using a telegraphic language model. It should be appreciated that the decoding using the telegraphic language model is in addition to decoding using the conventional language model. More specifically, conventional decoding using the conventional language model remains enabled while telegraphic decoding using the telegraphic language model also is enabled. Thus, the speech recognition system decodes the received user utterance using two different language models. After completion of step 550, the method can continue to step 560.

In step 560, the confidence score of the decoded user spoken utterance using the telegraphic language model can be compared to the confidence score of the decoded user spoken utterance using the conventional language model. If the confidence score using the telegraphic language model is greater than the confidence score using the conventional language model, the method can continue to step 580 where the speech recognition system can use the telegraphically decoded result as output text. If not, the method can continue to step 570, where the speech recognition system can use the conventionally decoded result as output text. Regardless, the speech recognition system can select the resulting decoded text having the highest confidence score to be the output text. In this manner the speech recognition system can select a text output which more accurately represents the received user spoken utterance.

Whether the method proceeds to step 570 or 580, the method can proceed to jump circle A to begin the method anew. Through several iterations, it should be appreciated that the speech recognition system can enable or disable the telegraphic decoding based upon a running average of the confidence score of closed-class words. In other words, the speech recognition system can continually calculate the running average of closed-class word confidence scores. If that average falls below a predetermined threshold value, the speech recognition system can begin decoding received user spoken utterances with both language models. The resulting text having the highest confidence score can be provided as output text. If the running average later exceeds the threshold value, the system can disable telegraphic decoding. As previously mentioned, if the system has sufficient computational resources, the mechanism for enabling and disabling telegraphic decoding is not necessary. In that case, the system can process all received user spoken utterances using both language models, selecting the word candidate having the highest confidence score as the text output.

What is claimed is:

1. In a speech recognition system, a method of selecting a language model for decoding received user spoken utterances, said method comprising the steps of:
   (a) computing confidence scores for identified closed-class words;
   (b) computing a running average of said confidence scores for a predetermined number of decoded closed-class words; and
   (c) based upon said running average, selectively enabling telegraphic decoding to be performed.

2. The method of claim 1, wherein in said step (c) telegraphic decoding is enabled in addition to conventional decoding.

3. The method of claim 1, further comprising the step of:
   (d) based upon said running average, selectively disabling telegraphic decoding.

4. In a speech recognition system, a method of decoding received user spoken utterances comprising the steps of:
   (a) decoding said received user spoken utterance with a conventional language model, said decoding resulting in a first word candidate;
   (b) decoding said received user spoken utterance with an alternate language model, said decoding resulting in a second word candidate, wherein said step (b) is independent from said step (a);
   (c) computing a confidence score for said first word candidate;
   (d) computing a confidence score for said second word candidate; and
   (e) selecting the word candidate having the highest confidence score.

5. The method of claim 4, wherein said alternate language model is a telegraphic language model.

6. The method of claim 4, wherein said first word candidate and said second word candidate are the same word.

7. In a speech recognition system, a method of decoding received user spoken utterances comprising the steps of:
   (a) decoding said received user spoken utterance with a conventional language model, said decoding resulting in a first word candidate;
   (b) decoding said received user spoken utterance with an alternate language model, said decoding resulting in a second word candidate;
   (c) computing a confidence score for said first word candidate;
   (d) computing a confidence score for said second word candidate; and
   (e) selecting the word candidate having the highest confidence score;
   wherein said first word candidate and said second word candidate are not the same word but have equivalent confidence scores, selecting said first word candidate.

8. In a speech recognition system, a method of decoding received user spoken utterances comprising the steps of:
   (a) decoding said received user spoken utterance with a conventional language model, said decoding resulting in a first word candidate;
   (b) decoding said received user spoken utterance with an alternate language model, said decodine resulting in a second word candidate;
   (c) computing a confidence score for said first word candidate;
   (d) computing a confidence score for said second word candidate; and
   (e) selecting the word candidate having the highest confidence score;
   wherein said first word candidate and said second word candidate are not the same word but have equivalent confidence scores, selecting said second word candidate.

9. A method of developing a telegraphic language model for use with a speech recognition system for converting telegraphic user spoken utterances to text, said method comprising the steps of:

loading an existing training corpus into a computer system;

revising said training corpus by removing closed-class words from said training corpus; and developing a telegraphic language model from said revised training corpus.

10. A speech recognition system for converting telegraphic user spoken utterances to text, said system comprising:

at least one acoustic model, said at least one acoustic model representing linguistic units for determining one or more word candidates from said telegraphic user spoken utterance;

at least one language model, said at least one language model providing contextual information corresponding to said one or more word candidates, wherein said at least one language model includes at least one telegraphic language model; and a processor, said processor processing said telegraphic user spoken utterances according to said at least one acoustic model and said at least one language model.

11. A machine readable storage, having stored thereon a computer program having a plurality of code sections executable by a machine for causing the machine to perform the steps of:

(a) computing confidence scores for identified closed-class words;

(b) computing a running average of said confidence scores for a predetermined number of decoded closed-class words;

(c) based upon said running average, selectively enabling telegraphic decoding to be performed.

12. The machine readable storage of claim 11, wherein in said step (c) telegraphic decoding is enabled in addition to conventional decoding.

13. The machine readable storage of claim 11, further comprising the step of:

(d) based upon said running average, selectively disabling telegraphic decoding.

14. A machine readable storage, having stored thereon a computer program having a plurality of code sections executable by a machine for causing the machine to perform the steps of:

(a) decoding said received user spoken utterance with a conventional language model, said decoding resulting in a first word candidate;

(b) decoding said received user spoken utterance with an alternate language model, said decoding resulting in a second word candidate, wherein said step (b) is independent from said step (a);

(c) computing a confidence score for said first word candidate;

(d) computing a confidence score for said second word candidate; and (e) selecting the word candidate having the highest confidence score.

15. The machine readable storage of claim 14, wherein said alternate language model is a telegraphic language model.

16. The machine readable storage of claim 14, wherein said first word candidate and said second word candidate are the same word.

17. A machine readable storage, having stared thereon a computer program having a plurality of code sections executable by a machine for causing the machine to perform the steps of:

(a) decoding said received user spoken utterance with a conventional language model, said decoding resulting in a first word candidate;

(b) decoding said received user spoken utterance with an alternate language model, said decoding resulting in a second word candidate;

(c) computing a confidence score for said first word candidate;

(d) computing a confidence score for said second word candidate; and (e) selecting the word candidate having the highest confidence score;

wherein said first word candidate and said second word candidate are not the same word but have equivalent confidence scores, selecting said first word candidate.

18. A machine readable storage, having stored thereon a computer program having a plurality of code sections executable by a machine for causing the machine to perform the steps of:

(a) decoding said received user spoken utterance with a conventional language model, said decoding resulting in a first word candidate;

(b) decoding said received user spoken utterance with an alternate language model, said decoding resulting in a second word candidate;

(c) computing a confidence score for said first word candidate;

(d) computing a confidence score for said second word candidate; and (e) selecting the word candidate having the highest confidence score;

wherein said first word candidate and said second word candidate are not the same word but have equivalent confidence scores, selecting said second word candidate.

19. A machine readable storage, having stored thereon a computer program having a plurality of code sections executable by a machine for causing the machine to perform the steps of:

loading an existing training corpus into a computer system;

revising said training corpus by removing closed-class words from said training corpus; and developing a telegraphic language model from said revised training corpus, comprising measuring a time period between a; least two of the dual tone multi-frequency signals.

* * * * *